(No Model.)
T. A. EDISON.
SYSTEM OF ELECTRICAL DISTRIBUTION.
No. 476,529. Patented June 7, 1892.
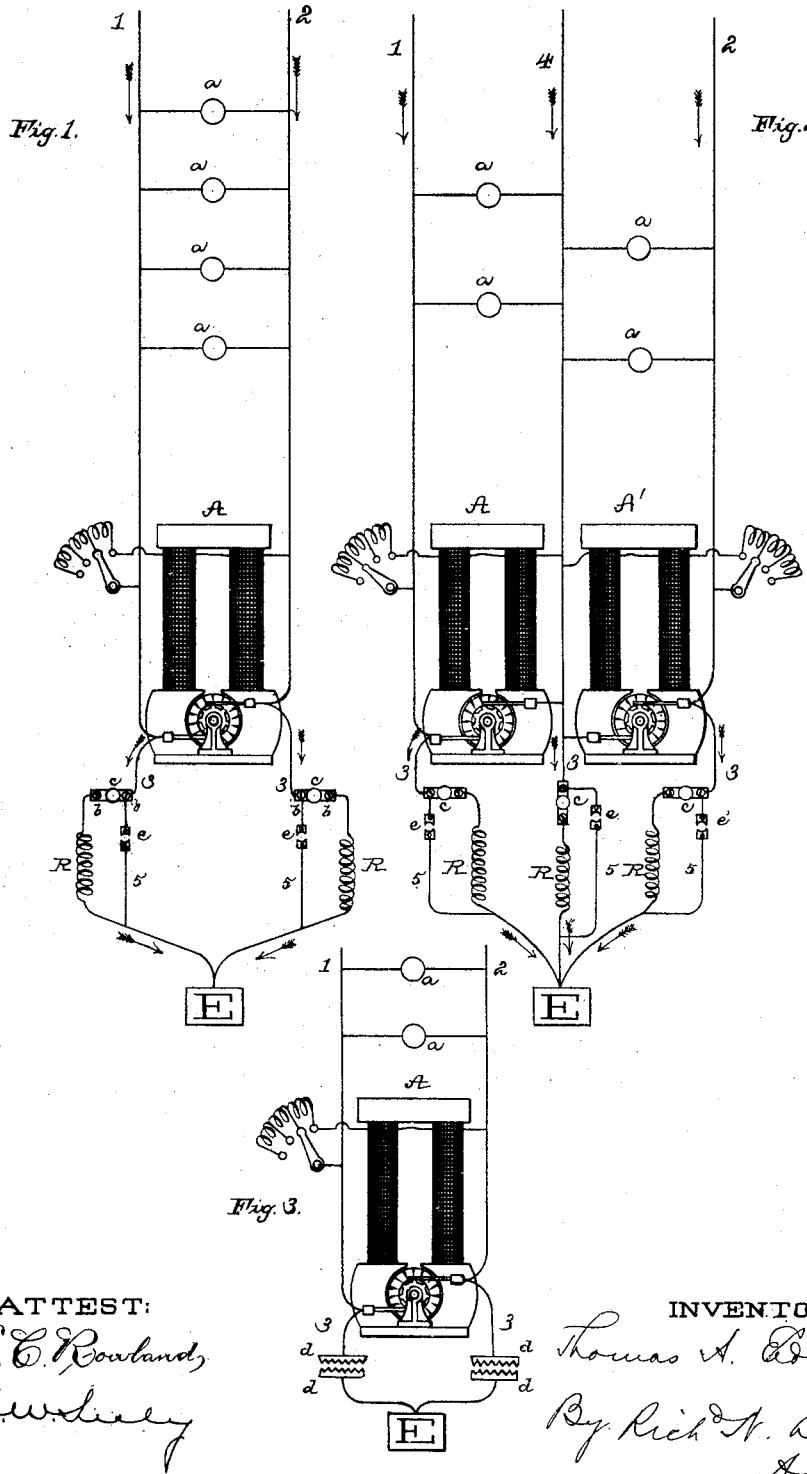
ATTEST:
E. C. Rowland
H. W. Seely
INVENTOR:
Thomas A. Edison
By Rich'd N. Dyer,
Atty.

UNITED STATES PATENT OFFICE.

THOMAS A. EDISON, OF MENLO PARK, NEW JERSEY.

SYSTEM OF ELECTRICAL DISTRIBUTION.

SPECIFICATION forming part of Letters Patent No. 476,529, dated June 7, 1892.

Application filed October 10, 1883. Serial No. 108,559. (No model.)

*To all whom it may concern:*

Be it known that I, THOMAS A. EDISON, of Menlo Park, in the county of Middlesex and State of New Jersey, have invented a new and useful Improvement in Systems of Electrical Distribution, (Case No. 589,) of which the following is a specification.

The object of this invention is to protect electrical generators and the translating devices supplied thereby from lightning, which may be conveyed to them when the main conductors of the system extend into exposed places.

Said invention is particularly intended to be applied to dynamo or magneto electric machines supplying multiple-arc systems of electrical distribution, in which systems the wires are supported overhead on poles or otherwise.

My invention consists in providing one or more dynamo-electric machines, two or more conductors extending therefrom to translating devices connected in parallel arc with such conductors, and means for forming a connection from said conductors to the earth without breaking their connection with the machine or machines, and in certain other combinations, as hereinafter more fully described, and as specified in the claims.

Where a round metallic circuit or a three-wire circuit, like that shown in my patent, No. 274,290, with both or all the conductors exposed, is employed, it is necessary to ground both or all the conductors of the circuit, for if only one conductor is grounded and the other is struck by lightning the lightning will pass through the generator and lamps to the ground connection of the other side.

The preferred manner of carrying out my invention is to employ a conductor at the central station, extending from each wire of the system to the ground. Each of such ground conductors is preferably provided with a plug or other circuit-controller which is closed upon the approach of a thunder-storm. The ground circuit thus provided is made of such resistance that the current taken by it from the lamp-circuits will be only a small part of the current of the entire system. If, however, either conductor is struck by lightning, the abnormal current will flow past the generator to the ground. In the three-wire or compensating system three ground connections are made one from each main conductor and one from the compensating conductor, or if there is more than one compensating conductor all the compensating conductors are connected to the earth. It is evident that these devices could be placed at any part of the system, though it is of course preferable to have them at the central station. In systems in which the generators are not kept in operation all the time I provide other ground conductors around the resistances in the first conductors. These are closed when the machines are stopped and act to protect the lamps from lightning-discharges which may occur when the machines are not running and the engineer is away from the station. These auxiliary circuits may of course be of low resistance, as they take no current from the system.

Instead of employing circuit-controllers to close the ground circuits at the proper times these circuits may be always broken at contact-plates provided with numerous points or projections across which the lightning will pass. This arrangement is of course the same as a high resistance in the closed circuit.

My invention is illustrated diagrammatically in the annexed drawings.

Figure 1 shows it applied to an ordinary multiple-arc system; Fig. 2, to a compensating system; and Fig. 3 illustrates the use of constantly-open ground circuits.

Referring to Fig. 1, A is a dynamo-electric machine, and 1 2 are main conductors extending therefrom, having lamps, motors, or other translating devices $a$ $a$ arranged in multiple arc upon them.

On each side of the machine, from or near its commutator-brushes, a conductor 3 extends to the earth E. Each conductor 3 is broken at contact-plates $b$ $b$, and plugs $c$ are provided for closing circuit. Each conductor 3 also contains a resistance R, so that when the plugs $c$ are inserted the current which will pass in said conductors will be equal to that taken by a small fraction only of the number of lamps employed in the system. These plugs $c$ are, as stated, inserted upon the approach of a thunder-storm, and if either conductor 1 or 2 is struck by lightning the electricity is conveyed to the earth through a conductor 3 without injury to the armature of the machine. The course of the lightning on either conductor is indicated by the arrows. A shunt 5 is formed around the resistance R of each conductor 3. These shunts 5 are closed at *e e* when the machines are not running and act to protect the lamps when the engineer is away in stations which are not in operation during the whole of the day.

In Fig. 2 two generators A and A' are shown connected in series and with the compensating conductor 4 extending from between them, the translating devices *a a* being connected between the compensating conductor and the main conductors 1 2. In this case the main conductors and the compensating conductor also have each a ground connection 3, provided with plug *c* and resistance R and a shunt 5 around such resistance. It is evident that if the compensating conductor were not provided with this ground connection and it should be struck by lightning the current would pass through the generator or lamps to reach the ground connection of one of the main conductors.

In Fig. 3, instead of employing resistances and plugs in the conductors 3, such conductors are broken at plates *d d*, placed a short distance apart and provided with projections extending toward each other. The lightning will pass across from one plate to the other. By this arrangement, of course, no current is taken from the lamps of the system. I prefer, however, the arrangement first described, for the loss when the circuit is closed can by properly proportioning the resistances be made comparatively small and the circuits would never remain closed for any great length of time.

What I claim is—

1. The combination of one or more dynamo-electric machines, two or more metallic conductors extending therefrom, translating devices connected in parallel circuit with such conductors, and means for forming a connection from each of said conductors to the earth without breaking its connection with the machine or machines, substantially as set forth.

2. The combination of one or more dynamo-electric machines, two or more metallic conductors extending therefrom, translating devices connected in parallel circuit with said conductors, and a ground connection from each of said conductors through a resistance, substantially as set forth.

3. The combination of one or more dynamo-electric machines, two or more metallic conductors extending therefrom, translating devices connected in parallel circuit with said conductors, an open conductor extending from each of said conductors to the ground, and means for closing said open conductors, substantially as set forth.

This specification signed and witnessed this 27th day of July, 1883.

THOS. A. EDISON.

Witnesses:
  H. W. SEELY,
  EDWARD H. PYATT.